United States Patent
Courtney et al.

(10) Patent No.: US 8,712,689 B2
(45) Date of Patent: Apr. 29, 2014

(54) METHOD FOR COMPUTER-BASED DETERMINATION OF A POSITION IN A MAP, NAVIGATION DEVICE AND MOBILE RADIO TELEPHONE

(75) Inventors: Ian Courtney, Rudelzhausen (DE); Josef Ploetz, Munich (DE); Dan Dinescu, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1507 days.

(21) Appl. No.: 11/536,899

(22) Filed: Sep. 29, 2006

(65) Prior Publication Data

US 2007/0100542 A1    May 3, 2007

(30) Foreign Application Priority Data

Sep. 29, 2005  (DE) .......................... 10 2005 046 735

(51) Int. Cl.
*G01C 21/04* (2006.01)
*G01C 21/32* (2006.01)
*G01C 21/26* (2006.01)
*G01C 25/00* (2006.01)

(52) U.S. Cl.
USPC ........... 701/523; 701/431; 701/487; 701/491; 701/526; 701/532; 701/538; 701/541

(58) Field of Classification Search
USPC ........... 340/995.1; 701/200, 208, 400–541, 1, 701/32.3; 702/5
See application file for complete search history.

(56) References Cited

U.S. PATENT DOCUMENTS

| | | | |
|---|---|---|---|
| 4,677,561 A | 6/1987 | Akama et al. | |
| 4,862,374 A | 8/1989 | Ziemann | |
| 5,113,185 A | 5/1992 | Ichikawa | |
| 5,848,373 A | 12/1998 | DeLorme et al. | |
| 6,924,748 B2 * | 8/2005 | Obradovich et al. | 340/905 |
| 2001/0033290 A1 * | 10/2001 | Scott et al. | 345/629 |
| 2006/0161348 A1 * | 7/2006 | Cross et al. | 701/213 |
| 2006/0190171 A1 * | 8/2006 | Cross et al. | 701/213 |

FOREIGN PATENT DOCUMENTS

| | | |
|---|---|---|
| DE | 33 15 613 A1 | 11/1985 |
| DE | 35 15 471 A1 | 11/1985 |
| DE | 101 63 723 A1 | 7/2003 |
| WO | WO-99/56082 A1 | 11/1999 |

\* cited by examiner

*Primary Examiner* — Khoi Tran
*Assistant Examiner* — Dale Moyer
(74) *Attorney, Agent, or Firm* — Schiff Hardin LLP

(57) ABSTRACT

A digitized image of a map is stored in a data memory. At least one point of the image of the map is selected as reference point. Space coordinates of the location which corresponds to the reference point are determined and allocated to the reference point. A supplementary calibration information item which enables the image of the map to be calibrated in space coordinates is determined. A mobile radio telephone has a navigation device which is set up for carrying out the method.

22 Claims, 2 Drawing Sheets

METHOD FOR COMPUTER-BASED DETERMINATION OF A POSITION IN A MAP, NAVIGATION DEVICE AND MOBILE RADIO TELEPHONE

BACKGROUND

The invention relates to a method for the computer-aided determination of a position on a map, and a navigation device and a mobile radio telephone.

Mobile electronic devices such as, e.g. a mobile radio telephone or a portable computer (personal digital assistant) can be equipped with a navigation function which operates by means of satellite-based navigation in accordance with the global positioning system (GPS). Such devices contain special navigation software and a GPS receiver or are connected to such a receiver. For the navigation, special navigation data are loaded in advance into the device, the GPS position is determined and the user is shown a map on which his position is marked. This enables navigation to be carried out in unknown territory. However, such a device or method is relatively complex. Navigation data of the required region suitable especially for the hardware and software used must be purchased in advance in each case and loaded into the device. The costs for the user are relatively high.

DESCRIPTION OF THE FIGURES

Exemplary embodiments of the invention are shown in the figures and will be explained in greater detail in the text which follows.

DESCRIPTION OF THE INVENTION

Figure 1:
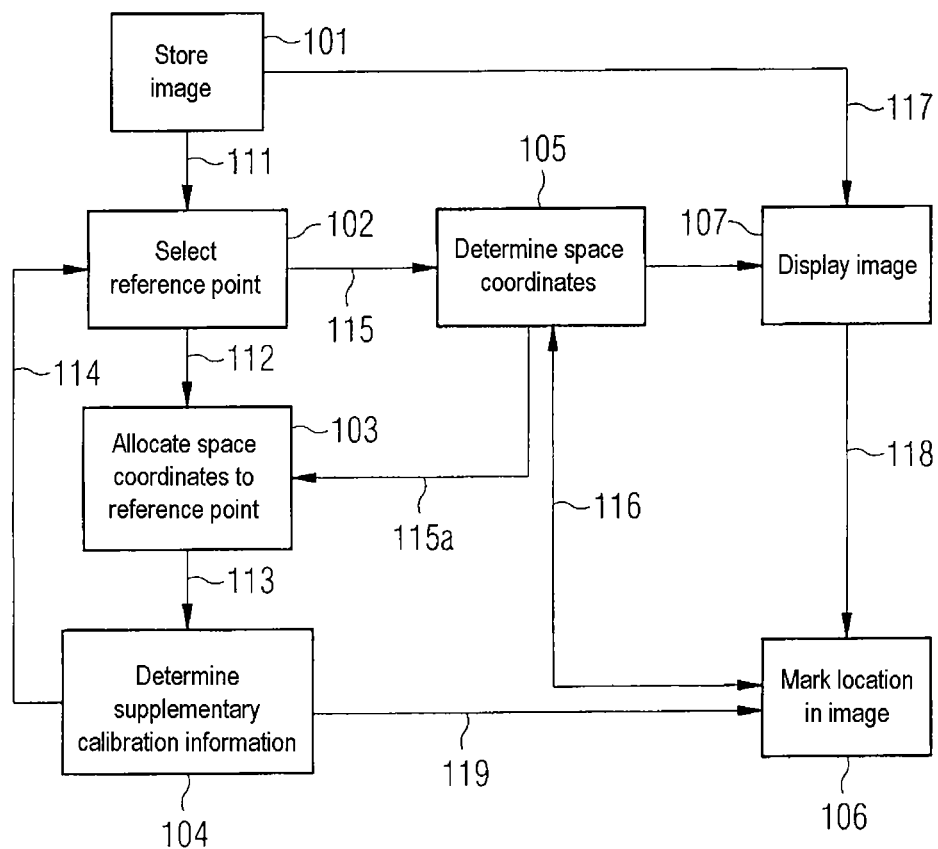
FIG. 1 shows a schematic diagram with function blocks, representing the functional interaction between various aspects of an exemplary embodiment of the invention.

According to one exemplary embodiment of the invention, navigation is made possible in a technically less elaborate manner and at lower cost than with conventional navigation.

According to one exemplary embodiment of the invention, a method for the computer-aided determination of a position on a map and a navigation device are provided.

In a method according to an exemplary embodiment of the invention for the computer-aided determination of a position on a map, a digitized image of a map is stored in a data memory. At least one point of the image of the map is selected. Space coordinates of at least one location which corresponds to the at least one selected point of the image of the map are determined and allocated to the at least one selected point of the image of the map. A supplementary calibration information item which enables the image of the map to be calibrated in space coordinates is determined.

According to an exemplary embodiment of the invention, a navigation device has a data memory which is set up for storing a digitized image of a map. A control device is coupled to the data memory and is set up for selecting at least one point of the image of the map and to allocate space coordinates to the at least one selected point of the image of the map. A space coordinate determining unit is coupled to the control device and is set up for determining space coordinates of at least one location which corresponds to the at least one selected point of the image of the map. Furthermore, the navigation device has a supplementary calibration information determining unit which is coupled to the control device and is set up for determining a supplementary calibration information item which enables the image of the map to be calibrated in space coordinates.

According to an exemplary embodiment of the invention, the computer-aided determination of a position on a digitized map is carried out with the aid of a reference position and a supplementary calibration information item. A point of the image of the map is selected and thus represents a reference point. Space coordinates of the location which corresponds to the reference point are determined and allocated to the reference point. A reference position is thus given and known, respectively. Expressed illustratively, the supplementary calibration information item enables measures of the digitized image of the map to be recalculated in units of space coordinates, e.g. in route lengths and directions, and conversely. This has the effect that for each position expressed by its space coordinates, if it lies within the region comprised by the digitized map, the image point of the map corresponding to this position is known or, respectively, can be calculated directly.

An exemplary embodiment of the invention has the advantage that a simple digitized image of an arbitrarily arranged map can be used. No special navigation data need to be purchased and provided. Instead, a map of any type and any type of terrain representation can be used as the original. This provides for navigation in unknown territory in a less technically elaborate manner and at lower cost.

The exemplary embodiments described apply both to the method and correspondingly to the corresponding device.

In a first advantageous embodiment, in a further method step, the image of the map is read out at least partially from the data memory and displayed to a user. A user can thus view the image of the map or a section of it.

In a further embodiment, space coordinates of the instantaneous location of the user are determined in an additional method step. The image point of the map corresponding to the instantaneous location of the user is thus known or can be calculated directly, respectively.

An embodiment in which, in a further method step, the instantaneous location of the user is marked in the image displayed is particularly advantageous. The user can thus recognize his instantaneous location more easily and more accurately when viewing the image of the map.

Advantageously, a photographic image of a map is stored in the method. Such an image can be created in a simple manner. For example, it can be scanned in or photographed. The original used for this purpose can be e.g. any conventional map printed on paper or also a map drawn individually. The designation map here refers to any type of map and can thus also be understood to be e.g. a city map, a road sketch etc. It can also be advantageous if a section of a map is selected and a photographic image of the selected section is stored. This makes it possible to avoid uninteresting parts of the map from being stored.

In one embodiment of the invention, the image of the map is stored as pixel graphics, also called bitmap graphics. A multiplicity of software and hardware tools are known for creating, storing, processing and displaying pixel graphics. The number of pixels or the pixel resolution, respectively, can be easily adapted to the requirements with regard to the spatial resolution in the determination of a position on the map.

An exemplary embodiment of the invention can be advantageously used in the case where the image is stored in a data memory of a mobile radio telephone and/or the image is displayed on a display of a mobile radio telephone. Current mobile radio telephones are well suited to this purpose since they are designed for multimedia applications, in most cases, and therefore have relatively large data memories and relatively large high-resolution displays.

It is also advantageous if a prominent point of the map is selected as the at least one selected point. For example, a point of intersection of intersecting structures of the map is selected as the at least one selected point. This provides for easier and more accurate determination of the space coordinates of the location which corresponds to the selected point.

In another advantageous embodiment, a point in the image displayed is marked and the marked point is selected as the at least one selected point. This provides information about which point is selected. As a result, the reference point can also be selected under the control of the user. The user advantageously selects which point is marked.

An embodiment in which the space coordinates of the instantaneous location of a or the user are determined as space coordinates of the at least one location which corresponds to the at least one selected point of the image of the map is particularly advantageous. The instantaneous location can thus be selected as reference position.

In another embodiment of the invention, the space coordinates of the at least one location which corresponds to the at least one selected point of the image of the map are determined from a user input. This provides for simpler determination of the space coordinates.

In another embodiment of the invention, the space coordinates of the at least one location which corresponds to the at least one selected point of the image of the map will be determined from features of the map. This provides for a determination of the space coordinates only from information which is already contained in the stored image of the map. The space coordinates of the at least one location which corresponds to the at least one selected point of the image of the map are advantageously determined, for example, from a coordinate grid network and/or from coordinate labels of the map.

In a further advantageous embodiment, the supplementary calibration information is determined by selecting at least one additional point of the image of the map and determining space coordinates of at least one additional location which corresponds to the at least one selected additional point of the image of the map and allocating them to the at least one selected additional point of the image of the map. Illustratively, this can be understood to mean that the concept of determining a reference position contained in the invention is used again with respect to an additional reference point. If two reference positions are known and allocated to the respective reference points, measures of the digitized image of the map can be recalculated into units of space coordinates and conversely. This provides the supplementary calibration information in a relatively simple manner.

An embodiment in which the supplementary calibration information is determined by determining the scale and the geographic orientation of the image of the map with reference to space coordinates is also particularly advantageous. Using scale and geographic orientation of the image of the map also provides for recalculation of measures of the digitized image of the map into units of space coordinates and conversely with only one known reference position. As a result, the supplementary calibration information is obtained without having to determine space coordinates of an additional reference point for this purpose, that is to say in a manner which is relatively simple from another aspect.

For example, the scale and/or the geographic orientation are determined from features of the map. This provides for the determination only from information which is already contained in the stored image of the map. It is advantageous if the scale is determined from a route, shown on the map, of a length known in space coordinates. It is also advantageous if the geographic orientation is determined from a direction, shown on the map, of known geographic orientation. Such routes and directions, respectively, in most cases exist in an easily recognizable manner on conventional maps.

In an exemplary embodiment of the invention, the scale and/or the geographic orientation are determined with the aid of a user input. The determination can thus be made under the control of the user and independently of contents of the stored map. For example, a route of length known in space coordinates is marked by the user for determining the scale in the displayed image of the map. For determining the geographic orientation in the displayed image of the map, a direction of known geographic orientation is advantageously marked by the user. Such routes and directions exist in an easily recognizable manner in most cases on conventional maps or are known to the user, respectively.

In a further advantageous embodiment, the space coordinates of the instantaneous location of a or the user are determined by a position measurement. For example, the position is measured with the aid of a satellite-based position determining method. This provides for precise, reliable determination convenient to the user.

According to another advantageous embodiment of the invention, a navigation device has a display device which is coupled to the control device and is set up for displaying the image of the map at least partially to a user. The space coordinate determining unit is set up for determining space coordinates of the instantaneous location of the user and the control device is set up for causing the image of the map to be read out at least partially from the data memory and to be transmitted to the display unit and the instantaneous location of the user to be marked in the image displayed by the display unit. A user can thus view the image of the map or a section of it and, while doing so, recognize his instantaneous location more easily and more accurately.

A particularly advantageous embodiment is obtained when a mobile radio telephone has a navigation device according to the invention. This is because the combination of a mobile radio telephone and a navigation device in one device which, as a rule, can be easily carried by a user, represents an extremely attractive product for the user.

It is particularly advantageous then if the mobile radio telephone has a camera which is coupled to the data memory. This makes it possible to photograph a map in a very simple manner and to store the photographic image.

A mobile radio telephone which has a navigation device according to the invention and in which the space coordinate determining unit contains a receiving device for signals for satellite-based position determination or is coupled to such a receiving device also represents an advantageous embodiment. Current mobile radio telephones frequently have such receiving devices. This provides for precise, reliable determination of space coordinates which is convenient to the user.

FIG. 1 shows various function blocks which relate to sequences of the method according to the invention and to components of the device in an exemplary embodiment of the invention. The function blocks in FIG. 1 are connected to one another by arrows which symbolize the functional interaction of the functions. The starting point for considering FIG. 1 is the block "store image" 101. From this, an arrow 111 points to the block "select reference point" 102. From this, an arrow 112 points to the block "allocate space coordinates to reference point" 103. From this, in turn, an arrow 113 points to the block "determine supplementary calibration information"

104. From block 104, an arrow 114 points back to block 102. A further arrow 115 points from block 102 to the block "determine space coordinates" 105. From this, in turn, an arrow 115a points to block 103. A double arrow 116 connects block 105 to the block "mark location in image" 106. Finally, an arrow 117 points from block 101 to the block "display image" 107 and from this, an arrow 118 points to block 106. A further arrow 119 points from block 104 to block 106.

Figure 2:
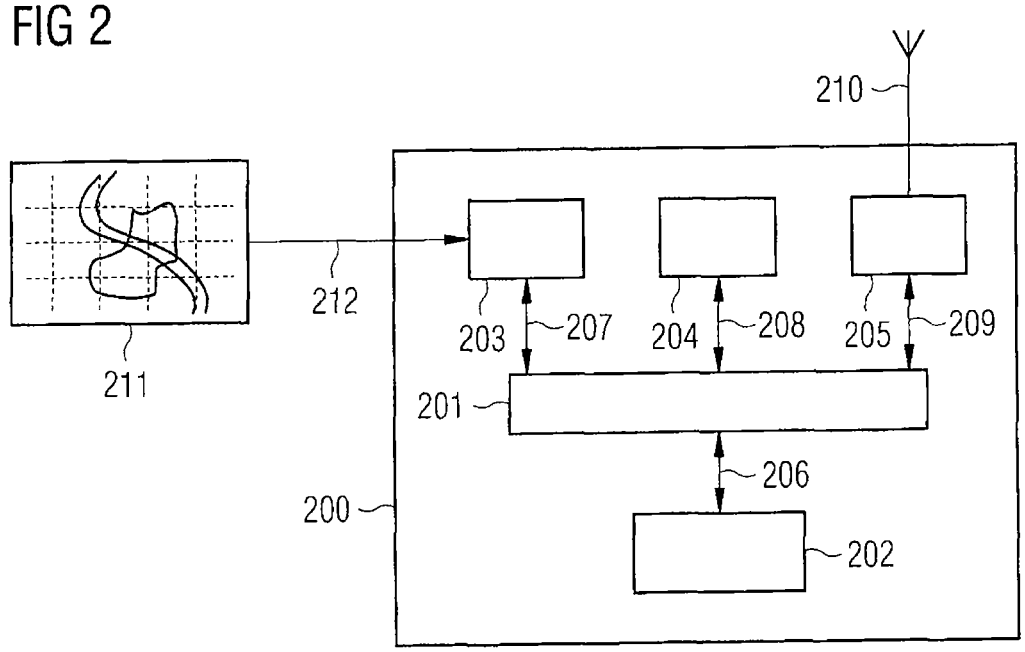
FIG. 2 shows a mobile radio telephone which is set up for carrying out a method according to an exemplary embodiment of the invention, as a block diagram.

FIG. 2 shows in a block diagram of some components a mobile radio telephone which is set up for carrying out a method according to an exemplary embodiment of the invention. To simplify the representation, other normal components of a mobile radio telephone which are not absolutely necessary for understanding the invention are not shown. In FIG. 2, a processor 201, a user interface 202 which contains a display and a keypad, a camera 203, a memory 204 and a GPS receiving unit 205 can be seen in a mobile radio telephone 200. The processor 201 is connected in each case by double arrows 206, 207, 208 and 209, which in each case symbolize a coupling of the components and the data flow in both directions, to the user interface 202, the camera 203, the memory 204 and the GPS receiving unit 205. The GPS receiving unit 205 is connected to a receiving antenna 210 through which the signals of the satellites of the GPS can be received. Outside the mobile radio telephone 200, a map 211 is shown. From this, an arrow 212 symbolizing the photographic recording of the map points to the camera 203.

According to an exemplary embodiment of the invention, the method is carried out by a mobile radio telephone 200 which contains a device according to an exemplary embodiment of the invention. A corresponding software application is executed on a processor 201 in the mobile radio telephone 200.

"Store Image" 101:

An image of a map 211 is recorded and digitized by means of a camera 203 installed in the mobile radio telephone 200, for example a photographic camera. The image data are stored as pixel graphics in a memory 204 of the mobile radio telephone. The image can also be recorded by means of a separate camera or scanned in by means of a scanner and then transferred to the mobile radio telephone. To use the resolution of the camera and the existing memory, respectively, to their optimum extent, the image is only recorded of the interesting part of the map.

Mathematically, the relationship between the coordinates of the stored image and space coordinates, i.e. GPS coordinates in the present case, can be considered as a planar transformation. In this process, distortions produced when photographing the map, such as, e.g. a perspective distortion, a shear or a nonuniform stretching or compression will not be taken into consideration. Distortions could be caused e.g. by an oblique viewing direction of the camera or optics of the camera which are unsuitable for the purpose of photography. However, a user will intuitively attempt to avoid such distortions so that these will remain small. In the general case, the transformation describing the relationship between the coordinates is thus essentially a composite of a translation, of uniform scaling and of a rotation.

The proportion of translation can be determined by calibrating the coordinates of a reference point which virtually acts as a new common coordinate origin. To make it possible to calibrate the image of the map in GPS coordinates, it is also additionally required to determine the scaling factor and the angle of rotation. The scaling factor and the angle of rotation can also be determined implicitly by means of a second additional reference point, the image coordinates of which are adapted to its GPS coordinates.

"Select Reference Point" 102 and "Allocate Space Coordinates to Reference Point" 103:

The user selects a reference point by marking a point with the cursor in the image of the map shown on the display (user interface 202) of the mobile radio telephone, e.g. he selects his current location, the GPS coordinates of which can be easily determined by measurement by means of the GPS receiving unit 205, or a particular prominent point on the map, the GPS coordinates of which are known. The reference point can also be selected automatically, i.e. without further action of the user, e.g. in the case where the map has a grid network with GPS coordinates. The space coordinates determined for the reference point are allocated to the reference point.

"Determine Supplementary Calibration Information" 104:

In one variant, the supplementary calibration information can be determined implicitly by a second reference point. The original map 211 can have e.g. at least two reference points with known GPS coordinates. The user then marks both reference points on the displayed image of the map. The user can also move successively to two different locations and mark his respective position, the GPS coordinates of which can be easily determined by measurement by means of the GPS receiving unit 205, as reference points. To ensure the accuracy of the calibration, these two locations should have an appropriate minimum distance in relation to the size of the region represented by the image of the map.

In an alternative variant, the supplementary calibration information is determined by determining information about the scale and the geographic orientation of the photographed image of the map.

The scale of the original map cannot be entered directly since it changes in a scarcely reproducible manner in the image of the map due to the photography. It is better if the user marks a suitable route on the image of the map displayed in the display (user interface 202) and enters its distance manually, e.g. by means of the keypad (user interface 202) or by voice input in the device. A particularly suitable reference route is the scale legend of a normal map or of a city map. The grid squares of known dimension, spanned by coordinate grid lines in normal maps and city maps are also well suited for deriving a reference route. If only a small section from a larger map has been photographed which has a varying scale, the scale used locally can be taken into consideration by means of the coordinate grid. In city maps by the company Falk, e.g. it is frequently the case that a city center is represented enlarged in comparison with the outlying districts and the scale changes continuously, but a grid of thin coordinate lines with constant spacing, e.g. one kilometer or 500 meters, covers the entire map.

Apart from the scale, the geographic orientation ("north orientation") of the photographed image of the map is needed. The photography can change the orientation of the image of the map so that the "top" direction of the display does not necessarily correspond to the "north" direction of the map. The north direction or another geographic direction is marked by the user as direction arrow on the image of the map displayed on the display (user interface 202). Since the usual maps and city maps are always north-oriented, the boundaries of the map section also photographed, for example, or the coordinate grid lines running north-south or east-west can be used as direction reference. As a standard, the mobile radio telephone expects, e.g., a direction arrow from south to north to be input and the user only needs to mark the starting and end points by means of the cursor. If the arrow input corresponds to a different direction, the user has to input the direction manually, e.g. by means of the keypad (user interface 202) or by voice input, e.g. as one of the main compass directions or in degrees of angle.

The cursor marking of reference route and reference direction is suitably combined. For this purpose, the user marks, for instance, one side of a grid square extending from south to north or side of a rectangle formed from a number of adjacent grid squares and enters their length related to the real terrain. Together with the GPS coordinates of a reference point, the device can then recalculate all GPS coordinates within the region covered by the stored image of the map into image points of the map. In this process, the accuracy is also significantly determined by the length of the reference route.

The supplementary calibration information can also be determined automatically in that the elements, structures and labeling suitable for this purpose and present in the image of the map are recognized or surveyed, e.g. by means of image processing software.

"Determine Space Coordinates" 105:

In the exemplary embodiment, space coordinates can be determined by GPS measurement, by user input or by automated detection and reading out of features or labels of the image of the map 211 stored in the memory 204. The mobile radio telephone 200 is equipped with a GPS receiving unit 205 for satellite-based position determination.

"Mark Location in Image" 106 and "Display Image" 107:

The image of the map is displayed to the user on the display (user interface 202) of the mobile radio telephone. Since its resolution is frequently lower than the resolution of the camera used for the photography, display methods such as enlarging, reducing, scrolling and automatic centering are applied so that the full resolution of the image can be used. The user can mark a point of the image by cursor and thus select this point or the associated location, respectively. Once the image of the map has been calibrated, the respective current position of the user, the space coordinates of which are determined by continuous GPS measurement, is marked in the displayed image.

The invention claimed is:

1. A method for the computer-aided determination of a position of a mobile device on a photographic image of a map, comprising:
   obtaining a digitized photographic image of the map, wherein the map is a non-geo-referenced map;
   storing the digitized photographic image of the map in a data memory;
   calibrating, by a processor, the digitized photographic image of the map in space coordinates by selecting at least one point of the digitized image of the map and a supplementary calibration information based on information provided by the photographic image of the map which enables the digitized image of the map to be calibrated in space coordinates;
   determining the position of the mobile device in space coordinates; and
   determining the position of the mobile device on the digitized photographic image of the map by mapping the position of the mobile device in space coordinates to a position on the digitized photographic image of the map based on the calibration of the digitized photographic image of the map in space coordinates.

2. The method as claimed in claim 1, further comprising:
   at least partially reading out the digitized photographic image of the map from the data memory; and
   displaying the at least partially read out digitized photographic image of the map to a user.

3. The method as claimed in claim 2, further comprising determining space coordinates of an instantaneous location of the user.

4. The method as claimed in claim 3, further comprising marking the instantaneous location of the user in the at least partially read out digitized photographic image displayed.

5. The method as claimed in claim 3, wherein the space coordinates of the instantaneous location of the user are determined by a position measurement.

6. The method as claimed in claim 2, further comprising:
   marking a point in the at least partially read out digitized photographic image displayed; and
   selecting the marked point as at least one selected point.

7. The method as claimed in claim 1, further comprising storing the digitized photographic image of the map as pixel graphics.

8. The method as claimed in claim 1, further comprising determining space coordinates of an instantaneous location of a user as space coordinates of at least one location which corresponds to at least one selected point of the digitized photographic image of the map.

9. The method as claimed in claim 1, further comprising determining space coordinates of at least one location which corresponds to at least one selected point of the digitized photographic image of the map from a user input.

10. The method as claimed in claim 1, further comprising determining space coordinates of at least one location which corresponds to at least one selected point of the digitized photographic image of the map from features of the map.

11. A navigation device for determining a position of a mobile device on a photographic image of a map comprising:
    an obtaining unit configured to obtain a digitized photographic image of the map, wherein the map is a non-geo-referenced map;
    a data memory configured to store the digitized photographic image of the map;
    a calibrating unit configured to calibrate the digitized photographic image of the map in space coordinates by selecting at least one point of the digitized image of the map and a supplementary calibration information based on information provided by the photographic image of the map which enables the digitized image of the map to be calibrated in space coordinates;
    a first position determining device configured to determine a position of the mobile device in space coordinates; and
    a second position determining device configured to determine the position of the mobile device on the digitized photographic image of the map by mapping the position of the mobile device in space coordinates to a position on the digitized photographic image of the map based on the calibration of the digitized photographic image of the map in space coordinates.

12. The navigation device as claimed in claim 11, further comprising a display unit which is coupled to a control device and is configured to display the digitized photographic image of the map at least partially to a user,
    wherein the first position determining device is configured to determine space coordinates of an instantaneous location of the user, and
    wherein the control device is configured to cause the digitized photographic image of the map to be read at least partially out of the data memory and to be transmitted to the display unit and the instantaneous location of the user to be marked in the at least partially read out digitized photographic image displayed by the display unit.

13. A mobile radio telephone comprising a navigation device as claimed in claim 11.

14. The navigation device according to claim 11, wherein the calibrating unit comprises:
- a control device which is coupled to the data memory and which is configured to select at least one point of the digitized photographic image of the map and allocate space coordinates to the at least one selected point of the digitized photographic image of the map;
- a space coordinate determining unit which is coupled to the control device and is configured to determine space coordinates of at least one location which corresponds to the at least one selected point of the digitized photographic image of the map; and
- a supplementary calibration information determining unit which is coupled to the control device and is configured to determine a supplementary calibration information item based on information provided by the photographic image of the map which enables the digitized photographic image of the map to be calibrated in space coordinates.

15. A navigation device for determining a position of a mobile device on a photographic image of a map comprising:
- an obtaining means for obtaining a digitized photographic image of the map, wherein the map is a non-geo-referenced map;
- a data memory configured to store the digitized photographic image of the map;
- a calibrating means for calibrating the digitized photographic image of the map in space coordinates by selecting at least one point of the digitized image of the map and a supplementary calibration information based on information provided by the photographic image of the map which enables the digitized image of the map to be calibrated in space coordinates;
- a first position determining means for determining a position of the mobile device in space coordinates; and
- a second position determining means for determining a position of the mobile device on the digitized photographic image of the map by mapping the position of the mobile device in space coordinates to a position on the digitized photographic image of the map based on the calibration of the digitized photographic image of the map in space coordinates.

16. The device according to claim 15, wherein calibrating the photographic image of the map in space coordinates comprises:
determining space coordinates of at least one location which corresponds to the at least one selected point of the digitized photographic image of the map, and allocating space coordinates to the at least one selected point of the digitized photographic image of the map.

17. The device as claimed in claim 16, wherein the supplementary calibration information is determined by:
selecting at least one additional point of the digitized photographic image of the map; and
determining space coordinates of at least one additional location which corresponds to the at least one selected additional point of the digitized photographic image of the map and allocating the space coordinates to the at least one selected additional point of the digitized photographic image of the map.

18. The device as claimed in claim 16, wherein the supplementary calibration information is determined by determining the scale and the geographic orientation of the digitized photographic image of the map with reference to space coordinates.

19. The device as claimed in claim 18, further comprising determining at least one of the scale and the geographic orientation from features of the map.

20. The device as claimed in claim 18, further comprising determining at least one of the scale and the geographic orientation with the aid of a user input.

21. A method for the computer-aided determination of a position on a photographic image of a map, comprising:
obtaining a digitized photographic image of the map, wherein the map is a non-geo-referenced map;
storing the digitized photographic image of the map in a data memory; and
calibrating, by a processor, the digitized photographic image of the map in space coordinates,
wherein calibrating the digitized photographic image of the map in space coordinates comprises:
- selecting at least one point of the digitized photographic image of the map;
- determining space coordinates of at least one location which corresponds to the at least one selected point of the digitized photographic image of the map, and allocating the space coordinates to the at least one selected point of the digitized photographic image of the map; and
- determining a supplementary calibration information item based on information provided by the photographic image of the map which enables the digitized photographic image of the map to be calibrated in space coordinates.

22. A navigation device for determining a position of a mobile device on a photographic image of a map comprising:
- an obtaining unit configured to obtain a digitized photographic image of the map, wherein the map is a non-geo-referenced map;
- a data memory configured to store the digitized photographic image of the map; and
- a calibrating unit configured to calibrate the digitized photographic image of the map in space coordinates;
wherein the calibrating unit comprises:
- a control device which is coupled to the data memory and which is configured to select at least one point of the digitized photographic image of the map and allocate space coordinates to the at least one selected point of the digitized photographic image of the map; and
- a space coordinate determining unit which is coupled to the control device and is configured to determine space coordinates of at least one location which corresponds to the at least one selected point of the digitized photographic image of the map; and
- a supplementary calibration information determining unit which is coupled to the control device and is configured to determine a supplementary calibration information item based on information provided by the photographic image of the map which enables the digitized photographic image of the map to be calibrated in space coordinates.

* * * * *